Feb. 26, 1935.  C. E. RECORDS  1,992,718
WELL SCREEN
Filed Dec. 31, 1934  2 Sheets-Sheet 1
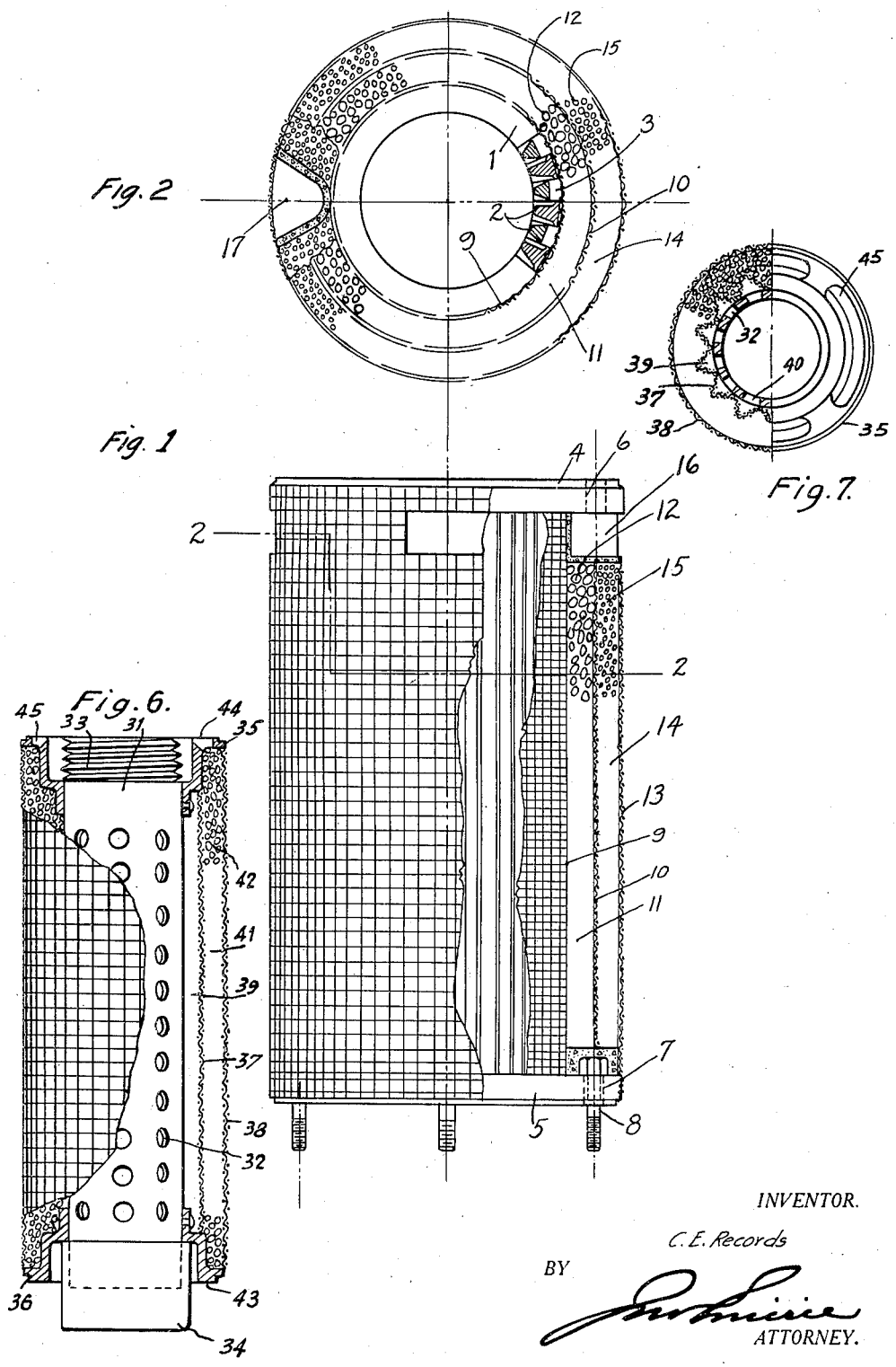
INVENTOR.
C. E. Records
BY
ATTORNEY.

Feb. 26, 1935.    C. E. RECORDS    1,992,718
WELL SCREEN
Filed Dec. 31, 1934    2 Sheets-Sheet 2

INVENTOR.
C. E. Records
BY
ATTORNEY.

Patented Feb. 26, 1935

1,992,718

UNITED STATES PATENT OFFICE 1,992,718

WELL SCREEN

Chester E. Records, Columbus, Ohio

Application December 31, 1934, Serial No. 760,010

6 Claims. (Cl. 166—5)

This invention is directed to a method of constructing and an improvement in well screens designed with a view to an effective screening of the incoming fluid without material retardation of the flow incident to the screening apparatus.

In connection with well screens of this type, the screen usually embodies an inner member formed for the passage of the water and an outer surrounding filtering medium usually constructed of loose pebble-like bodies of different sizes through which the water is more or less filtered prior to its passage through the inner member. Ordinarily the screen is made up in sections arranged for connection in endwise relation to provide a screen of the requisite length, and the screen proper or inner member may be made up of separate bars associated and connected to form such inner member, and to provide the necessary water entrances, or may be made up as a tubular pipe-like element of appropriate length formed with openings or slots to admit the water.

The inner member of the well screen is delivered to the job in completed form, for where the member is made up of independent bars, they are assembled and secured at the factory, and where the member is an integral, tubular, pipe-like element, it is, of course, naturally of proper form. Heretofore it has been invariably necessary, so far as known, to assemble the filtering media in proper correlation to the inner member on the job, i. e. before the screen sections are lowered into the well the various screen cloth sections are assembled in proper relation to the inner member and to each other and the filtering media positioned within these sections. This filtering media, ordinarily in the form of pebble-like bodies, is usually applied in two layers transversely of the screen, the innermost layer being of larger pebble-like bodies than the outermost layer, with a well defined line of division between the layers.

Experience has proven that it is rather difficult to train well drillers to apply this filtering media as it should be applied for the best results, and not infrequently where the filtering media is applied on the job there is an improper filtering of the incoming water. The difficulty of completing the entire screen section including the filtering media at the factory in order to secure the effective distribution and arrangement of the filtering media resides in the fact that during transportation of the screen section from the factory to the job the filtering pebbles change their position incident to the jars of travel and become more compact, and thus not only interfere with the proper filtering of the incoming water, but leave an unfilled cavity in the screen section which, of course, is without filtering effect, and thus a decided disadvantage.

The present invention is, therefore, directed primarily to a method of securing the filtering media against relative movement during transportation or from other cause in order to permit the entire screen section including the filtering media to be completed at the factory and delivered to the job without the slightest disturbance of the filtering elements during transportation or through handling. Thus a filtering section may be made up as a complete unit at the factory, with the filtering media arranged to secure the best results for the particular use so that the workmen on the job may simply assemble the section, with the necessary additional sections, and thus not only be relieved of the work of applying the filtering media but enabled to use a screen which will be scientifically designed with respect to the filtering media for the best possible results.

It is important in connection with a screen section of this type that there be arranged between the innermost wall of the filtering media and the inner member a plurality of unobstructed spaces for the initial collection and reception of the water passing through the filtering media and its permissible free entrance through the inner member. In connection with some types of screens, the inner member is itself inherently formed to provide for these series of free spaces, while in those types of screens where the inner member is a single pipe-like element, means must be provided to secure these free water spaces, and this provision in connection with screens having inner members of the type referred to forms a material part of the present invention.

In carrying out the method, the pebble-like elements making up the filtering media, whether in two or more layers of different size elements, or in a single layer of the same or various size elements, as may be indicated by the particular use of the screen element, are provided with means by which they become more or less a rigid body in their relative positions as made up at the factory, with of course such rigid body having filtering spaces ordinarily provided between adjacent pebble-like elements incident to their configuration and arrangement. This result is secured by providing the pebble-like filtering elements with a light coating of cement prior to their application as filter-forming layers to the inner member, the cementitious covering being permitted to dry and harden before the particular screen section is moved for shipment. Thus each pebble will become united to the adjacent pebbles at their varying points of contact in a manner to form a more or less rigid relation between them, it being understood that the cement covering of the respective pebbles is insufficient to interfere in any material way with the filtering spaces formed between the pebbles when assembled in the usual manner.

When thus associated, the entire screen section including the inner member and the surrounding layer or layers of filtering media may be readily and conveniently assembled at the factory, with proper arrangement of the filtering media, and transported to the job, with the assurance that such filtering media will remain in the position originally provided in the initial assemblage at the factory, and thus insure that the particular well screen will be most effective in the particular use for which it is designed, as the method employed permits of the desired arrangement of the filtering media at the factory and under skilled manipulation and the delivery to the job of the screen sections so constructed without change in the position and relation of the filtering media.

Under this method, the screen section as a whole may be completed at the factory and transported to the job as desired, avoiding the usually unreliable or at times inefficient handling and placing of the filtering media by the men on the job.

While the invention is primarily directed to the method described, various other features of construction are necessary in providing for and permitting factory assemblage, and such details, together with the method, are illustrated in the accompanying drawings, in which:

Fig. 1 is a view in elevation, partly in section, showing the improved method and construction used in connection with an inner member of a particular type.

Fig. 2 is a transverse section on the line 2—2 of Fig. 1.

Fig. 6 is a view in elevation, partly in section, of a modified form of the invention.

Fig. 7 is a plan view, partly in section, of the same.

Figure 8:
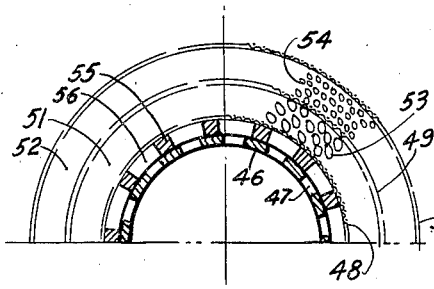
Fig. 8 is a broken transverse section of a further modification.

In the form of the invention shown in Fig. 2, the screen section is made up of an inner member 1 constructed of bars 2 formed and arranged to provide exterior water pockets 3. The details of this formation are in accordance with the showing in my co-pending application filed November 4, 1929, Serial No. 404,786 allowed July 29, 1932, and no further description of these parts is necessary herein.

It is understood that the bars making up the inner screen member are assembled at the factory and delivered to the job and that heretofore the filtering media which will be now referred to has been applied by the well drillers. As the essential object of the present invention is to make this screen section including the inner member and the filtering media complete at the factory, it will be understood that the details of assemblage now to be described are completed at the factory and the entire section so formed is delivered to the job.

The inner member of the screen section includes upper and lower flanges 4 and 5 which extend beyond the inner member to receive and support the filtering media. These flanges are formed with bolt holes 6 and 7 respectively by which the screen sections may be fixed and aligned with adjacent screen sections in making up a screen of the desired length. In the contemplated form of a section, the lower flange 5 is provided with the securing bolts 8 passing through the bolt holes 7, while the upper bolt holes 6 of a section are left free to provide for obvious connection of the sections in endwise relation.

In carrying out the method and constructing the section, the bolts 8 are applied to the lower flange of the inner member and the heads are covered with cement so that the bolts will remain firmly in place as applied. Of course, as indicated in Fig. 1, the bolts depend below the flange 5 in order to permit the passage of such bolts through the flange 4 of the next lower screen section and present projecting ends for the reception of nuts for uniting the sections. After the bolts are applied, an inner layer 9 of screen cloth is applied over and concentric with the inner screen member 1. This screen cloth section 9 rests in contact with the outer ends of the outstanding bars of the inner section so that the water pockets 3 remain clear and unobstructed between the intermediate bars and the screen cloth section 9.

A screen cloth cylindrical section 10 is then arranged about and spaced from the section 9, providing an area 11 concentric with the inner screen member 1 for the reception of one layer of the filtering media. This layer of filtering media, ordinarily selected pebbles 12 of appropriate size, is then applied in the space 11, the filtering being accomplished through an upper opening, which will be later referred to.

Prior to the application of the filtering pebbles or elements of this layer, such pebbles or elements are lightly coated with cement. An outer concentric section of screen cloth 13 is then applied, providing with the screen cloth section 10 an outer space 14 for the reception of filtering media. The filtering media of this space 14 is in the form of pebbles or like elements 15, preferably of smaller size than the filtering elements 12, and prior to the application of these filtering pebbles 15 they too are coated with a light coating of cement for the purposes mentioned.

As stated, the upper flange 4 of the screen section has unobstructed bolt openings 6 through which the bolts 8 of the next superimposed section are to pass for securing the sections together. This arrangement necessitates that openings be afforded in the completed screen section for applying the securing nuts to the lower end of the bolts as the sections are assembled, and for this purpose both the screen cloth sections 10 and 13 are cut out at 16 immediately below the upper flange 4 of the section in vertical alignment with the bolt openings 6, with the cut out portions of sufficient area to permit convenient application of the nuts. These openings 16 afford entrance openings for the convenient filling of the spaces 11 and 14, and initially the filtering media 12 and 15 are applied through the openings 16. When the filtering media has reached the bottom level of the openings, removable cores 17 corresponding in size and shape to the openings 16 are applied successively to these openings, the spaces 11 and 14 between the cores being, after the application of each core, filled with the proper filtering media between the cores.

After the filtering media has had an opportunity to set, or in other words the cement to dry sufficiently, to unite the filtering pebbles into a substantially rigid mass, the cores are withdrawn and thus the completed screen, insofar as the filtering area is concerned, is completely filled with the filtering medium in proper layers except for the openings 16, which openings remain permanently to provide for the connection of superimposed screen sections together, as heretofore referred to.

If desired, and as preferred, the cores 17 may be coated with cement so as to provide a cementitious lining, so to speak, for the openings 16 which will materially assist in holding the filtering media in place after the withdrawal of the cores.

Figure 4:
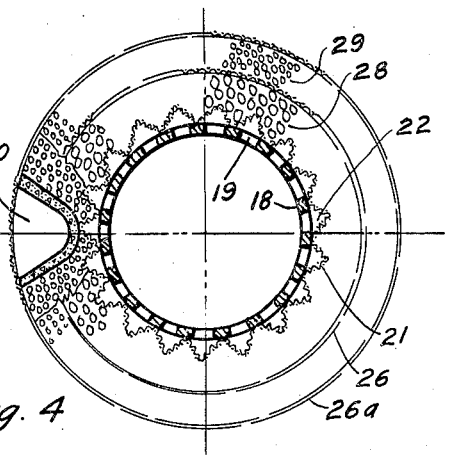
Fig. 4 is a section on the line 4—4 of Fig. 3.
Figures 3, 5:
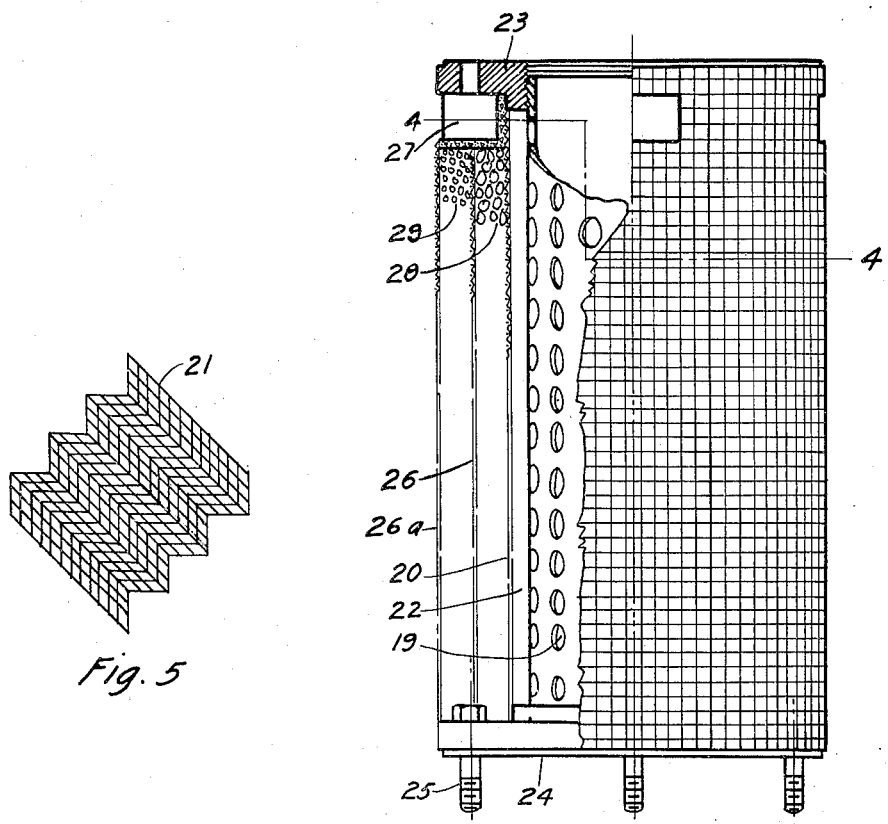
Fig. 3 is a view in elevation, partly in section, showing the construction and method applied to a well screen section having a type of inner member differing from that shown in Fig. 1.
Fig. 5 is a perspective view of a portion of the inner screen cloth section employed in connection with the form shown in Figs. 3 and 4.

In the form of the invention shown in Figures 3, 4 and 5, the inner secreen member, indicated at 18, is a pipe-like element formed with openings 19 for the passage of the water. These openings, of course, may be of any form, either circular holes or elongated slots. In this form, it is important to provide the free water pockets immediately adjacent the inner screen member, and for this purpose the inner screen cloth section 20 corresponding to the section 9 of the preferred form is particularly constructed to provide these free water pockets, i. e. this inner screen cloth section 20 is of corrugated or sinuous form, as at 21, the indentations, when the screen cloth section 20 is applied about the inner screen member 18, providing spaces 22 which are more or less transversely aligned with the openings or slots 19 and provide the free water pockets desirable in this type of screen.

In this form, the upper and lower flanges 23 and 24 are removably secured upon the inner screen member 18, and bolts 25 are secured in the lower flanges in the manner described in connection with the preferred form. There is an intermediate and an outer screen cloth member 26 and 26a, as in the preferred form, this member being in concentric spaced relation with the outer plane of the screen cloth member 20. The screen cloth members 20 and 26 are formed at the upper ends with a cut-away portion 27 to provide for the insertion of the respective filtering media here shown, as in the preferred form, as an inner layer 28 and an outer layer 29, the latter being of relatively smaller size pebble-like elements, and in this form, as in the preferred form, the method employed in securing these filtering elements against relative movement after the make-up of the entire screen section unit at the factory by applying a cementitious covering to the elements is carried out. A plug 30 corresponding to the plug 17 of the preferred form is used in this modified form and for the same purpose.

In the form shown in Figures 6 and 7, the inner screen element is a pipe-like member 31 formed with openings 32, the member 31 of each screen section being exteriorly threaded at its upper end, as at 33, and provided at its lower end with a more or less permanent coupling member 34 interiorly threaded to receive the upper threaded end of the adjacent coupling for uniting the screen sections. In this form, the inner screen member 31 is provided with upper and lower brackets 35 and 36, these brackets being relatively off-set to provide seats for the encircling screen cloth sections 37 and 38. The inner screen cloth section is preferably of the corrugated form shown in the modification illustrated in Figure 3, the vertical channels 39 forming with the wall of the inner member 31 the necessary free water pockets 40. The outer screen cloth member 38 is arranged in concentric spaced relation to the inner screen cloth member and defines a single space 41 for the reception of filtering elements 42 of pebble-like units which, as in the other forms, are coated with cementitious material to insure that the elements will remain in relatively fixed position during transportation and handling.

The upper and lower brackets are so relatively arranged that when adjacent screen units are connected, the outstanding section 43 of the lower bracket will rest squarely on the similar outstanding section 44 of the upper bracket for the next lower section. This arrangement permits the formation in the outstanding section 44 of the upper bracket of a series of openings 45 through which the filtering units 42 may be introduced to fill the space 41, these openings 45 underlying the outstanding portion 43 of the lower flange 36 of the next upper section.

In Figure 8, there is illustrated a still further form in which the inner screen member, indicated at 46, is in the form of a tubular element formed with water passages 47 and an appropriate arrangement of screen cloth sections surrounding the element, the inner screen cloth section 48 being next the inner member 46, the intermediate screen cloth section 49 being spaced from the section 48, and the outer screen cloth member 50 being spaced from the section 49. The spaces provided by these screen cloth sections 51 and 52 are arranged to receive filtering media 53 and 54 disposed as described in connection with the preferred forms. Of course, in this instance the filtering media in the form of pebble-like bodies have such elements coated with cement in order that they may be secured against relative movement after being properly arranged at the factory to thus insure that the completed filtering section will reach the job in the desired form. The manner of filling the spaces 51 and 52 will be the same as that described in connection with the preferred forms, as the inner screen section 46 may, in the form shown in Figure 8, have the removable flanges corresponding to those shown in Figure 3 or those shown in Figure 6.

The essential detail of the modification shown in Figure 8 is the arrangement of the means for providing the free water pockets immediately adjacent and beyond the inner screen member 46. These water pockets are formed in this particular modification by spacer bars 55 which may extend the full or a portion of the length of the inner member 46 and which may be secured to the screen cloth section 48. These spacer bars space the screen cloth section 48 from the outer surface of the inner member 46 to thereby provide the desired free water pockets 56.

The essential characteristic of the present invention is the cementing of the units making up the filtering media in place, with the ultimate purpose of permitting the formation of the screen unit at the factory complete ready for assemblage and use in a well, while avoiding any displacement of the filtering media units or pebbles during transportation or handling. It is quite apparent that ordinary mason cement may be used and equally apparent that other materials will answer the purpose such, for example, as asphalt cutback, tar, shellac, or any well known cementing material. The sole requirement is that the material shall be of a character which will permit the pebbles or other filtering media bodies to be readily coated and which, when hardened, hold such bodies in place as installed during the transportation and handling of the filtering section. With the use of the cementing material on the filtering pebbles, it is not necessary to tamp them tightly in place, and naturally greater porosity is obtained than where they are tamped, and this increased porosity is incident to the fact that the pebbles cannot change their position or become more closely united or compact. Therefore, this particular step of the method not only insures that the entire screen section may be made up at the factory with the filtering media arranged with particular regard to the service desired, but that the desired porosity of the filtering medium as a whole may be provided for with particular regard to known conditions and maintained during the transportation of the section to the well and its installation in the well.

What is claimed to be new is:

1. A unitary well screen section comprising upper and lower annular members, an inner member extending from one annular member to the other and formed for the passage of water therethrough, an outer foraminous member spaced from the inner member and extending between the annular members, and a filtering body disposed in and substantially filling the space between the inner and outer members and made up of a series of irregularly shaped independent elements having limited points of contact to thereby present irregular interstices through the body, and means for connecting the elements at their points of contact to maintain the elements in fixed relation to each other during transportation, handling and use of the screen.

2. A unitary well screen section comprising upper and lower heads, an inner member extending between the heads and formed for the passage of water therethrough, an outer foraminous member extending between the heads and in spaced concentric relation with the inner member, and a rigid filtering member arranged and substantially filling the space between the inner and outer members, the filtering body being made up of irregular independent elements united one with the other at irregular points of contact.

3. A unitary well screen section comprising upper and lower heads, an inner member extending between the heads and formed for the passage of water therethrough, an outer foraminous member extending between the heads and in spaced concentric relation with the inner member, and a rigid filtering body arranged and substantially filling the space between the inner and outer members, the filtering body being made up of irregular independent elements united one with the other at irregular points of contact, the inner member being formed to provide uninterrupted water spaces between the filtering body and the outer surface of said inner member.

4. A unitary well screen section comprising an upper and a lower annular head, bolts carried by and projecting below the lower head for connecting said head in superimposed relation to a similar section in making up the screen, the upper head being formed with openings to receive the bolts of a superimposed well screen section, an inner member uniting the heads and formed for the passage of water therethrough, an outer foraminous member uniting the heads and spaced from the inner member, and a rigid filtering body arranged in and substantially filling the space between the inner and outer members, said body overlying and bearing upon the bolts carried by the lower head.

5. A unitary well screen section comprising an upper and a lower annular head, bolts carried by and projecting below the lower head for connecting said head in superimposed relation to a similar section in making up the screen, the upper head being formed with openings to receive the bolts of a superimposed well screen section, an inner member uniting the heads and formed for the passage of water therethrough, an outer foraminous member uniting the heads and spaced from the inner member, and a rigid filtering body arranged in and substantially filling the space between the inner and outer members, said body being interrupted immediately below the openings in the upper head to permit the application of securing nuts to the bolts from the superimposed sections when the sections are connected.

6. A unitary well screen section comprising upper and lower annular heads, an inner screen member uniting the heads, an outer screen member uniting the heads and arranged in concentric spaced relation to the inner screen member, and a filtering body arranged and substantially filling the space between the outer and inner screen members, said body being made up of pebble-like bodies united in a rigid whole at irregular points of contact.

CHESTER E. RECORDS.